Figure 1:
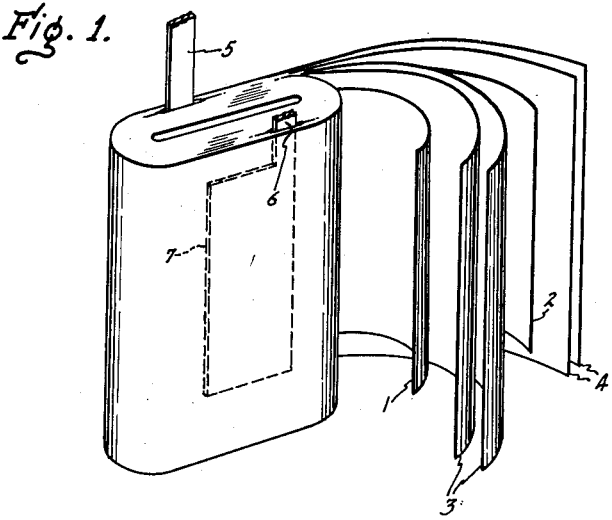

Jan. 26, 1960

J. R. HUTZLER 2,922,937

CAPACITOR AND DIELECTRIC MATERIAL THEREFOR

Filed Feb. 8, 1956

Inventor
John R. Hutzler,
by Gilbert P. Tarleton
His Attorney.

United States Patent Office 2,922,937
Patented Jan. 26, 1960

---

2,922,937

CAPACITOR AND DIELECTRIC MATERIAL THEREFOR

John R. Hutzler, Fort Edward, N.Y., assignor to General Electric Company, a corporation of New York Application February 8, 1956, Serial No. 564,340

5 Claims. (Cl. 317—258)

---

The present invention relates to capacitors (static electric condensers). More particularly, the invention relates to an improved dielectric material of a solidified resinous type for capacitors.

Dielectric materials or impregnants of solid resinous or plastic type have been preferred in the past to liquid dielectrics for use in capacitors for several reasons. The solid dielectrics make possible operation of capacitors at higher temperatures, they will not leak out of the capacitor, higher insulation resistance is obtained, smaller sizes of capacitors are possible, and longer capacitor life is provided, especially at elevated temperatures.

Polystyrene is an example of a solid dielectric material which has heretofore found favor in capacitor applications. Walker Patent 2,665,400, assigned to the same assignee as the present invention, discloses another form of solid dielectric impregnant obtained from the copolymerization of a mixture of styrene, polyalpha methyl styrene and divinyl benzene. The Walker material, referred to hereinafter as styrene copolymer as distinguished from the present material referred to as vinyl toluene copolymer, constitutes an improvement over polystyrene and other solid dielectrics in, among other things, avoiding the formation of voids in the plastic mass due to shrinkage during the curing process.

This styrene copolymer, while superior to other types of known dielectric material, has, however, not fully satisfied the increasingly severe operating requirements for present day capacitors, e.g., with respect to life, dielectric strength and insulation resistance characteristics. Resistance of this and other types of solid dielectrics to thermal shock particularly has not been sufficient to satisfactorily withstand the more stringent operating conditions to which capacitors are now being subjected.

It is an object of the present invention to provide capacitors having improved electrical, thermal and life characteristics.

Another object of the present invention is the provision of a solid dielectric material of the above type which confers particularly outstanding characteristics of thermal shock resistance to electrical devices, particularly capacitors, in which it is incorporated.

It is still another object of the invention to provide capacitors and other electrical devices incorporating a dielectric impregnant composed of a vinyl toluene copolymer which possesses and retains favorable dielectric characteristics after long periods of operation at elevated temperatures and other severe operating conditions.

Other objects and advantages will become apparent from the following description and the appended claims.

The above objects and others are attained in accordance with the invention by a solid resinous dielectric material composed essentially of a copolymer of vinyl toluene and divinyl benzene obtained from a starting mixture of the two ingredients wherein the divinyl benzene is preferably present to about 1–10% by weight. In other embodiments of the invention, the copolymer mixture also contains styrene and/or alpha methyl styrene in monomeric or polymeric form.

Figure 2:
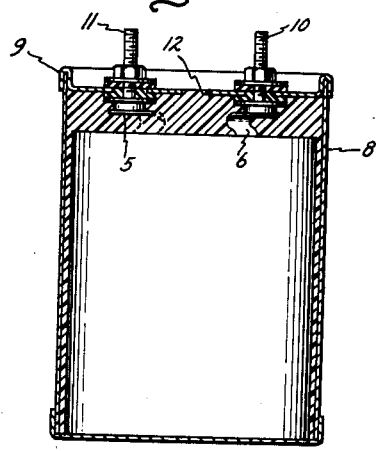

The invention will be better understood from the following description taken in conjunction with the accompanying drawing, in which:

Fig. 1 is a perspective view of a partially unrolled capacitor assembly of a type in which the present invention may be suitably embodied; and Fig. 2 is a view partly in section of a capacitor with the assembly of Fig. 1 enclosed within a container.

Referring now to the drawing, and particularly to Fig. 1, there is shown a capacitor assembly constructed in the usual manner except for the dielectric impregnant. As is shown in Fig. 1, the assembly may be made by winding strips 1 and 2 of metal foil such as aluminum or copper in an alternating arrangement with interleaved sheets 3, 4 of paper to form a roll in which the foil armatures are separated substantially only by the paper layers. Electrical contact is made with the foil armatures 1, 2 by means of tap straps 5, 6 or by any other suitable means. Tap straps 5, 6 may be welded to the armatures, if desired, to obtain better contact and the lower part of terminal straps 5, 6 may be enlarged as shown by portion 7 to provide a larger contact area.

The dielectric sheets or spacers, 3, 4 do not usually exceed .001 inch in thickness and, preferably, they are made of kraft or linen paper. For operation at voltages up to about 600 v. D.C., two or three sheets of 0.0003 inch or 0.0004 inch kraft capacitor paper are quite satisfactory. At higher voltages additional paper sheets may be used. While kraft paper spacers are preferred, other types of spacer material may be used, such as polyethylene terephthalate or other suitable dielectric material.

The wound assembly of armatures and paper spacers is placed in a metal container 8 and a cover 9 is arranged thereon so as to hermetically seal the capacitor assembly. The tap straps 5, 6 are connected respectively to outer terminals 10 and 11 as shown in Fig. 2. Cover 9 is provided with a small aperture 12 through which the moisture from the capacitor assembly may be driven off and through which the impregnant may be introduced into the assembly.

In a typical process of making the capacitors, the capacitor assembly in the container is vacuum-dried before impregnation to remove residual moisture. This drying treatment may be at a temperature ranging between 60° C. and 150° C. depending on the length of the drying cycle. The liquid impregnant mixture is introduced into the capacitor container while the dried assembly is still under a vacuum, enough resin mixture being admitted to completely fill the container. The assembly is permitted to soak under residual vacuum for at least an hour, after which the pressure is then raised to one atmosphere and the capacitor assembly soaked in the impregnant mixture for at least one hour, the temperature of impregnation being about 25° C.–40° C. After impregnation, the units may be either sealed and cured or else cured before sealing. It has been found preferable to seal the units before curing so that the outer surface of the container may be cleaned of all resinous material while it is still in the liquid state. The curing cycle conditions depend upon the particular resin composition used and the size of the capacitor. A suitable cure cycle used in accordance with the invention may consist of slowly raising the temperature from 25° C. to 125° C. over a period of 14 hours followed by 4 hours at 125° C.

In accordance with an embodiment of the invention it has been found that capacitors of superior properties may be made by impregnating the paper spacers 3, 4 with a copolymerizable mixture comprising at least vinyl toluene and about 1–10% by weight of divinyl benzene. While the invention involves in its broad aspects a copolymer of the above materials, the starting mixture preferably also contains suitable proportions of styrene and alpha methyl styrene, the latter material being either in polymeric or monomeric form. In general, the proportions of the constituents which may be used in accordance with the invention are, in percent by weight, 1–98% of vinyl toluene, 0–90% styrene, 0–50% alpha methyl styrene (monomer or polymer), and 1–10% divinyl benzene. A small amount of catalyst such as tertiary butyl hydroperoxide or other suitable known accelerators or catalysts may also be present.

The unsatisfactory resistance of the styrene copolymer dielectric material referred to above to thermal shock has been attributed to the brittleness of the dielectric resin impregnant and its shrinkage during polymerization. Preventive measures taken in the past to avoid these conditions included lowering of the concentration of divinyl benzene in the starting mixture so that the resulting copolymer does not become brittle. Also, relatively large amounts (e.g. 40%) of alpha methyl polystyrene have been added as an extender to reduce shrinkage and also as a plasticizer. In view of this prior art teaching, it was surprising to find that excellent thermal shock characteristics could be obtained with the present dielectric material using high concentrations of divinyl benzene and in the absence of alpha methyl polystyrene. Styrene itself has been omitted from compositions of the present invention while still obtaining satisfactory results. Further, not only are excellent thermal shock properties obtained, but also electrical characteristics such as life, insulation resistance, capacitance and power factor have been produced which are superior to those of styrene copolymer and other known solid dielectrics.

The vinyl toluene used in the invention is a mixture of isomers and is added in the form of a liquid. A typical composition of this material contains, in percent by weight, 60% meta-vinyl toluene and 40% para-vinyl toluene.

In general, the proportion of divinyl benzene used in preparing the copolymer is about 1–10% by weight of the mixture. Concentrations of divinyl benzene below that range will not result in sufficient cross-linking to produce a proper copolymer, while higher concentrations appear to cause undesirable embrittlement of the final product. In a typical commercially available composition there is present a mixture of isomers of divinyl benzene, diethyl benzene and ethyl vinyl benzene, the divinyl benzene being present in such a mixture in an amount of about 50–60% by weight. The materials in the commercial mixture other than divinyl benzene, however, are inert in so far as cross-linking or thermosetting properties are concerned in the present invention.

A typical commercial sample of divinyl benzene has the following composition in percent by weight:

| | Percent |
|---|---|
| Divinyl benzene | 55.0 |
| Ethyl vinyl benzene | 35.4 |
| Diethyl benzene | 9.6 |

Para-tert-butyl-catechol may be present in the above material as an inhibitor in a concentration usually about 1,000 parts per million.

The following examples of vinyl toluene-divinyl benzene mixtures, in percent by weight, are given only by way of illustration of compositions which may be used in accordance with the invention, and it is not intended thereby to limit the scope of the invention in any way:

EXAMPLE I

| | Percent |
|---|---|
| Styrene | 65 |
| Divinyl benzene (60% solution) | 10 |
| Alpha methyl styrene | 15 |
| Vinyl toluene | 10 |

EXAMPLE II

| | Percent |
|---|---|
| Styrene | 75 |
| Divinyl benzene (60% solution) | 10 |
| Vinyl toluene | 15 |

EXAMPLE III

| | Percent |
|---|---|
| Styrene | 65 |
| Divinyl benzene (60% solution) | 5 |
| Alpha methyl styrene | 25 |
| Vinyl toluene | 5 |

EXAMPLE IV

| | Percent |
|---|---|
| Styrene | 65 |
| Divinyl benzene (60% solution) | 15 |
| Vinyl toluene | 20 |

EXAMPLE V

| | Percent |
|---|---|
| Vinyl toluene | 67.5 |
| Divinyl benzene (60% solution) | 7.5 |
| Alpha methyl polystyrene | 25.0 |

EXAMPLE VI

| | Percent |
|---|---|
| Styrene | 65 |
| Divinyl benzene (60% solution) | 10 |
| Alpha methyl polystyrene | 15 |
| Vinyl toluene | 10 |

EXAMPLE VII

| | Percent |
|---|---|
| Vinyl toluene | 90 |
| Divinyl benzene | 10 |

In preparing the various mixtures of the present dielectric material for testing in accordance with the procedures described below, each of the tested mixtures was catalyzed with 0.3% tertiary butyl hydroperoxide. In making the capacitor units for the following tests, the capacitors were dried at 125° C. under vacuum of less than 500 microns and impregnated with the respective dielectric compositions. The impregnants were then cured in situ by heat at temperatures rising slowly from 25° C. to 125° C.

In the following Table I, various characteristics of the above dielectric compositions are compared at temperatures of 25° C., 100° C. and 125° C., the capacitance and percent power factor being measured at 110 v.-60 cycles per second and insulation resistance being measured at 500 v. D.C. at 1 minute electrification. The values given are averages of two samples of each composition. The prior art styrene copolymer material with which the present compositions are compared was made of the copolymerization product of 54% styrene, 6% divinyl benzene and 40% alpha methyl polystyrene.

Table I

| Impregnant | Vinyl Toluene Copolymers | | | | Styrene Copolymer |
|---|---|---|---|---|---|
| | I | II | III | IV | |
| 25° C. | | | | | |
| Cap. mf | 0.95 | 0.97 | 0.92 | 0.98 | 1.0 |
| Percent P.F. | 0.30 | 0.30 | 0.30 | 0.30 | 0.40 |
| IR meg.-mfd | 16,000 | 16,500 | 16,000 | 16,500 | 12,000 |
| 100° C. | | | | | |
| Cap. mf | 0.97 | 0.98 | 0.94 | 0.99 | 1.0 |
| Percent P.F. | 0.26 | 0.26 | 0.26 | 0.26 | 0.26 |
| IR meg.-mfd | 212 | 196 | 155 | 192 | 144 |
| 125° C. | | | | | |
| Cap. mfd | 0.97 | 0.99 | 0.95 | 0.99 | 1.0 |
| Percent P.F. | 0.49 | 0.57 | 0.57 | 0.54 | 0.43 |
| IR meg.-mfd | 123 | 82 | 86 | 94 | 51 |

In a separate test comparing vinyl toluene copolymer composition V with the styrene copolymer, where the characteristics above were measured at 125° C. the capacitance and percent power factor were substantially the same in both copolymers, but the average IR of the composition V was about 24% higher than that of the styrene copolymer. Further, dielectric strength tests made between these two copolymers showed a dielectric strength in volts per mil for the vinyl toluene copolymer of an average of 5900 as compared to 5180 for the styrene copolymer.

It will be evident from the above data that the present copolymer dielectric compounds in general have insulation resistance values decidedly superior to the prior styrene copolymer dielectric, with little or no change in capacitance and power factor.

Comparative thermal cycle tests were made on various types of the present copolymers and on the styrene copolymer, this test consisting of the following procedure. The capacitors were maintained at −55° C. for at least one-half hour followed by room temperature conditioning for not more than one-half hour, after which the capacitors were placed in an oven at 125° C. for at least one-half hour. After each of these temperature cycles, the capacitors were given a one-second dielectric test of 1200 v. D.C. at room temperature. It was found that capacitors incorporating the present copolymer materials as impregnants had on the average a considerably greater resistance to failure than the prior styrene copolymer impregnant under the above severe thermal cycle treatment. Whereas some units with the present dielectric material withstood more than 114 cycles of this treatment, the maximum for the styrene copolymer material was only 74 cycles.

In tests made on D.C. dielectric strength, where composition II was compared with styrene copolymer, the average dielectric strength of several units of the present material was 4,440 v. per mil as compared to 2,666 v. per mil of the styrene copolymer. Life tests made on the same materials wherein the units were subjected to 560 v. D.C. at 125° C. showed that of the units impregnated with the present material only 8% had failed after 2,431 hours, whereas of the units with styrene copolymer dielectric material 50% had failed by that time.

In further tests on low temperature characteristics to determine change in capacitance of the units at −55° C. as compared to 25° C., it was found that the average decrease in capacitors having various compositions of the present vinyl toluene copolymers was 4.2% while that of the styrene copolymer material was 5.4%.

The electrical characteristics of the present dielectrics even when the impregnants were stored for a prolonged period at low temperature were still satisfactory. In one such storage test the following results (as measured at 125° C.) were obtained, the values being an average of several capacitor units with the composition of Example II as impregnant:

Table II

| | Initial | After 16 weeks at −20° C. |
|---|---|---|
| Cap.—mfd | 1.01 | .99 |
| Percent P.F. | 0.40 | 0.30 |
| IR meg.-mfd | 113 | 119 |

From the results of the various tests described above, it will be apparent that the present vinyl toluene copolymers provide marked improvements in capacitors in terms of insulation resistance, life, dielectric strength, change in capacitance at low temperature and thermo cycle resistance. In all these characteristics, which are particularly important in capacitors for D.C. application, the present material is superior to the styrene copolymer and other solid capacitor impregnants heretofore used, and the copolymers of the present invention provide capacitors which are well within the strictest requirements of industry as to these characteristics. A further advantage of the present vinyl toluene copolymers, as shown by Table II, is their ability to be stored in the monomeric state for long periods without degradation of the electrical characteristics of capacitors impregnated with these materials. This insures the continued high quality of capacitors impregnated with these copolymers even though the material has been used repeatedly and stored for prolonged periods of time.

While particular compositions of the present vinyl toluene copolymers have been set forth above, it is not intended to limit the invention to the specific compositions disclosed, since the ingredients may be varied from the proportions shown while still producing satisfactory results in accordance with the invention. Moreover, capacitors of other types of construction than that shown, e.g., stacked capacitors, may suitably incorporate the present copolymer dielectric materials, and electrical apparatus other than capacitors may likewise be used in the application of the present dielectric material.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. A dielectric sheet material comprising a porous dielectric sheet impregnated with a copolymerized mixture in percent by weight of 5–90% vinyl toluene, 1–10% divinyl benzene, and at least one compound selected from the group consisting of styrene, alpha methyl styrene and alpha methyl polystyrene.

2. Electrical apparatus comprising an electrical conductor insulated with a dielectric compound comprising the copolymerization product of a mixture in percent by weight of 5–90% vinyl toluene, 1–10% divinyl benzene, and at least one compound selected from the group consisting of styrene, alpha methyl styrene and alpha methyl polystyrene.

3. Electrical apparatus comprising, in combination, spaced electrical conductors and insulating material arranged therebetween, said insulating material comprising the solid copolymerization product of a mixture in percent by weight of 5–90% vinyl toluene, 1–10% divinyl benzene, and at least one compound selected from the group consisting of styrene, alpha methyl styrene and alpha methyl polystyrene.

4. A capacitor comprising, in combination, cooperating armatures and dielectric spacer material therebetween, said dielectric spacer material including the solid copolymerization product of a mixture in percent by weight of 5–90% vinyl toluene, 1–10% divinyl benzene, and at least one compound selected from the group consisting of styrene, alpha methyl styrene and alpha methyl polystyrene.

5. A capacitor comprising, in combination, cooperating armatures and dielectric spacer material therebetween, said dielectric spacer material comprising paper sheets impregnated with the solid copolymerization product of, in percent by weight, 5–90% vinyl toluene, 0–90% styrene, 1–10% divinyl benzene, and 0–50% of a compound selected from the group consisting of alpha methyl styrene and alpha methyl polystyrene.

References Cited in the file of this patent

UNITED STATES PATENTS

| | | |
|---|---|---|
| 2,089,444 | Staudinger | Aug. 10, 1937 |
| 2,340,109 | D'Alelio | Jan. 25, 1944 |
| 2,366,007 | D'Alelio | Dec. 26, 1944 |
| 2,665,400 | Walker | Jan. 5, 1954 |

OTHER REFERENCES

Boundy-Boyer: "Styrene, Its Polymers, Copolymers and Derivatives," Reinhold (1952), pages 1232, 1241–44.